Patented Apr. 30, 1935

1,999,443

UNITED STATES PATENT OFFICE 1,999,443

ART OF JELLY PREPARATION

Raymond Edward Cox, Corona, Calif., assignor to California Fruit Growers Exchange, Los Angeles, Calif., a corporation of California No Drawing. Application November 10, 1931, Serial No. 574,221

12 Claims. (Cl. 99—11)

This invention relates to the art of manufacturing jellies, jams and similar food products. It is particularly directed to a method of preparing fruits naturally high in pectin content and to the utilization of such fruits in the manufacture of jams and jellies of satisfactory quality.

Certain fruits such as cranberries, blueberries, tart plums, etc., are characterized by the fact that they contain considerable quantities of what appears to be a naturally rapid setting pectin. Furthermore, these fruits contain appreciable quantities of acid.

As a result, when these fruits are used in the ordinary processes for making jams and jellies, jams or jellies of suitable commercial texture are not readily produced. Unsatisfactory jams and jellies are almost invariably produced from these fruits when the process is carried out in such manner that the proportion of fruit, sugar and solids concentration corresponds to generally accepted governmental bureau specifications. One of the distinguishing characteristics of these specifications is that the final jelly be made to contain at least 65% soluble solids. If a jelly be prepared by taking 50 parts of cranberry juice and 50 parts of sugar and this mixture boiled until the soluble solids reach a concentration of 65%, it will be found that "presetting" has occurred to such a marked extent that the jelly is entirely unsuited to commercial uses. This presetting or partial setting of the jelly mass takes place in the kettle before pouring and may be termed a premature gelation. Presetting is a phenomenon which will occur to some extent whenever in the jelly batch the pectin, sugar and acid are present in such proportions that the gel forming process begins during the boiling.

A discussion of this subject matter may be found in the article entitled "Does sugar inversion affect pectin jelly formation?" by Cole, Cox and Joseph in Food Industries, volume 2, No. 4, May 1930.

In some fruits as, for example, in those referred to hereinabove, such amounts of pectin and acid are present in the fruit that a gel forming proportion is reached before the solids concentration reaches 65%. Consequently, the gel structure is formed and this disrupted by the continued boiling, resulting in a mass which will never set to a firm jelly but which, on the other hand, will be distinctly salvy or will even remain comparatively fluid. The product appears to consist of particles of jelly in a fluid medium and even in cases where the solids concentration is not carried to 65% it is frequently found that the pectin naturally occurring in these fruits is present in such quantities, and/or has the characteristic of setting so rapidly, that it is practically impossible to pour the cooked jelly mass into containers before the gel forming action is substantially complete and consequently even in these cases an unsatisfactory texture results. With these same fruits, jams which are usually and characteristically less firm and less elastic than jellies, are correspondingly unsatisfactory.

It has been discovered that by suitably treating the fruit, the pulped fruit mass, or the fruit juice, it is possible to eliminate the naturally occurring pectin or to destroy its gel forming and quick setting characteristics so that a premature gelation or presetting does not occur.

In other words, it has been found that when the naturally occurring, quick setting pectin of the fruit is removed from the sphere of action, a satisfactory and desirable firmness and texture may be obtained in the jelly or jam which is subsequently made from such fruit. This process may be successfully accomplished by means of a suitable enzyme capable of degrading, destroying, or otherwise eliminating the undesirable pectin naturally occurring in the fruit. The pectin and/or its quick setting characteristics may be rendered innocuous in other suitable ways. An enzyme which is capable of producing this result without deleteriously affecting the fruit juice or residual fruit products, is pectinase.

It is an object of this invention to disclose and provide a new method for making satisfactory jams and jellies from fruits having a naturally high content of quick setting pectin and acid.

Another object of this invention is to provide and disclose a method of treating fruits high in natural pectin content whereby such pectin is prevented from causing presetting during the manufacture of jams and jellies therefrom.

A further object of this invention is to provide and disclose a method of making clear jellies of good texture from fruits high in pectin having quick setting characteristics.

An object of this invention is to provide and disclose methods and means for making jams and jellies in which the pectin naturally occurring in fruits is prevented from displaying its usual gel forming characteristics.

Still another object of this invention is to provide and disclose a method of treating fruits naturally high in quick setting pectin in which the readily available natural pectin occurring in the fruit is broken down and rendered innocuous by means of a suitable agent such as an enzyme.

A still further object of this invention is to disclose and provide a method of preparing fruits high in natural pectin content for jam and jelly manufacture in which the naturally occurring pectin is eliminated, degraded, destroyed and/or rendered innocuous by means of pectinase.

A still further object of this invention is to disclose and provide a method of treating fruits whereby the separation of pulp and juice is facilitated and an increased yield of juice suitable for use in the manufacture of jams and jellies is obtained.

An object of this invention is to provide and disclose a process of preparing fruits high in natural pectin and acid content whereby the formation of strong or bitter flavors is prevented.

These and other objects, uses and advantages of this invention will be in part obvious and in part will appear to those skilled in the art from a contemplation of the invention as set forth herein and in the appended claims.

In general, the process of this invention may be carried out by softening, pulping or disintegrating the fruit so as to reduce it to a mass of pulp and then treating the mass so as to eliminate, destroy or degrade the naturally occurring pectin of the fruit.

The destruction of the pectin may be attained by inoculating the pulpy mass of fruit with pectinase and maintaining the mass at a temperature suitable for the action of the enzyme for a sufficiently long period of time to insure the desired destruction or elimination of the naturally occurring pectin. The treated pulp may then be used in the manufacture of the jam or jelly. If a clear product is desired, the pulpy mass may be screened or otherwise clarified and the juice employed in the manufacture of the jelly product. For example, suitable amounts of pectin, acid and sugar or sugar and pectin alone may be added to the fruit juice and the mixture boiled until the desired solids concentration is reached. The mixture may then be poured into containers and allowed to set. The high temperature will inactivate the enzyme.

For purposes of illustration, a specific and detailed description of the process will be given embodying the invention so that those skilled in the art may more completely comprehend a preferred method of making and using the same.

In the manufacture of jelly products from cranberries, for example, the following procedure may be employed:

Four cups of cranberries may be placed in an equal volume of boiling water so as to cause disruption of the berries, or the cranberries may be boiled in the water until the pulp is separated from the skins. This may require ten minutes. If the pulp of the fruit is to remain and be present in the final product, the boiled pulp may be sieved or otherwise treated so as to remove the skins, and the pulp then cooled to a temperature of between about 38° C. and 40° C. and inoculated with a suitable proportion such as 1% by weight, of a solution containing pectinase. The mixture should be maintained at approximately the temperature given here as this seems to be about the optimum for the operation of the enzyme. The temperature may vary, however, over a range extending from about 25° C. to 50° C.

The inoculated mass should be allowed to stand a suitable time so as to permit a breaking down of the pectin by the enzyme. This period of time may be adjusted to suit other particular conditions. It will vary some with the temperature, the pH of the mixture, the amount of pectin present, and the concentration of enzymes employed. Ordinarily, it has been found that the mass may be allowed to stand a period of 12 hours, or over-night, and a practically complete destruction of the naturally occurring pectin be assured.

A suitable amount of sugar, such as an equal proportion by weight, may then be added to the depectinized mass and this mass jellified with a suitable pectin, preferably a pectin having slow setting characteristics. The mass may be boiled until the soluble solids content reaches 65% so as to cause the product to conform with the present statutory requirements.

It is to be understood that the proportions given may be varied as desired, particular proportions being given hereinabove merely for illustrative purposes. As stated hereinabove, the action of the enzyme upon the pectin is somewhat influenced by the pH of the mixture. It has been found that a pH of between about 3.1 and 3.5 is generally satisfactory. Natural fruit juices vary in pH as well as in the amount of pectin, with the condition of the fruit. If a batch of fruit of unusual characteristics is being treated, it may be desirable to adjust the pH of the pulp to between about 3.1 and 3.5 before inoculating the same with the enzyme.

In case it is desired to make a jelly which does not contain the pulpy part of the fruit, the fruit pulp may be cooled to 38° C.–40° C. without sieving, and then inoculated. When the action of the enzyme is substantially complete, it will be found that the liquid mass will drain rapidly, as for example through a muslin cloth, so as to yield a brilliantly clear juice. This fruit juice may then be employed in the manufacture of jelly and where a properly selected pectin is employed, it will yield a jelly of highly desirable characteristics, firm, elastic, and yet tender. The jelly will be brilliantly clear. It is particularly to be noted that in this process, not only is a vastly improved texture and brilliant clarity obtained, but in addition a much more complete recovery of the juice and a much easier separation of the juice from the pulpy part of the fruit. Both of these latter items, as will be readily appreciated, have great commercial importance.

One enzyme preparation which may be employed very satisfactorily is derived from *Penicillium glaucum*. This may be grown on citrus peel material or upon any other suitable natural or artificial medium. The enzymes may be employed either as a solution or may be precipitated by means of alcohol or other suitable agents and employed in the solid form. The potency of the particular preparation employed may readily be determined by adding varying amounts to aliquot portions of a fruit or fruit juice or of a standard pectin solution and determining the time required for satisfactory destruction of the pectin to take place at a given temperature.

The amount of the enzyme preparation which is employed in the actual jelly making preparation, may be widely varied. At present, I do not regard it as necessary to use more than enough to bring about a satisfactory removal of pectin in 3 or 4 hours.

Any suitable source of enzyme may be employed or the enzyme may be obtained commercially. While specific reference has been made to pectinase as the enzyme to be employed since this is at present the term applied to the enzyme or group of enzymes apparently specific for the hydrolysis of pectin, it will be apparent that any enzyme capable of breaking down the pectin may be employed whether it be specific to pectin or not, as long as it does not have a distinctly deleterious effect upon the fruit or juice, with relation to the final product.

In the manufacture of the final product, preference has been expressed for a pectin having slow setting characteristics but it is not necessary to use such pectin. Any suitable pectin may be employed and it has been found that it is quite possible to get desirable results by using the pectin naturally occurring in the fruit. This can be done by eliminating the pectin from one part of the fruit, as set forth hereinabove, and then adding to this a suitable amount of fruit or fruit juice from which the pectin has not been removed. Thus the pectin in the mixture is present in a considerably smaller amount and the tendency toward very rapid setting is reduced. Where this procedure is to be followed, it is necessary to evaluate the fruit in terms of the setting power of the pectin present with each supply or batch of fruit so as to properly proportion the depectinized fruit to that from which the pectin has not been removed.

In large scale operations where the fruit is of substantially uniform characteristics, the amount of enzyme added may be reduced so as to merely partially destroy or degrade the pectin, the residual pectin being then utilized in obtaining the final jellification.

Experiments have borne out the fact that products made in accordance with this invention have an improved flavor. With cranberries, for example, it has been found that cranberry products are objectionable because of their characteristically strong and bitter flavor. The products produced in accordance with this invention, however, have been found highly acceptable because of their milder and more delicate, yet still characteristic flavor. This is a highly important advantage of this process and the products resulting therefrom.

It will be obvious to those skilled in this art that the present invention is of great utility in the manufacture of jams and jellies from any fruit in which the naturally occurring pectin has a tendency to cause difficulty. Furthermore, it is applicable to all types of products into whose manufacture the jellification of pectin enters.

The invention is not limited to the specific examples, materials and conditions expressed hereinabove but includes all such changes and modifications as come within the scope of the appended claims.

I claim:

1. In a process of preparing jam and jelly from fruits naturally high in pectin content, the steps of reducing the fruit to a pulpy mass, inoculating the mass of fruit with an enzyme capable of destroying the pectin, maintaining the mass at a temperature near the optimum for the action of the enzyme until the pectin is substantially destroyed, and then jellifying the depectinized fruit.

2. In a process of preparing jam and jelly from fruits high in natural pectin content, the steps of reducing the fruit to a pulpy mass, inoculating the mass of fruit with pectinase, maintaining the mass at a temperature between 25° C. and 50° C. until the natural pectin of the fruit is rendered innocuous, and then jellifying the depectinized fruit.

3. In a process of manufacturing jam or jelly from fruit containing pectin having quick setting characteristics, the steps of softening the fruit to form a mass, inoculating the softened fruit mass with pectinase, maintaining the mass at a temperature of about 38° C.–40° C. until the natural fruit pectin is rendered substantially innocuous, adding pectin and sugar to said depectinized fruit, and jellifying the same.

4. In a process of preparing jams and jellies from fruits containing pectin having quick-setting characteristics, the steps of reducing the fruit to a pulpy mass, inoculating the mass of fruit with an enzyme capable of destroying pectin, maintaining the mass at a temperature near the optimum for the action of the enzyme until the natural pectin of the fruit is rendered innocuous, and then jellifying the same.

5. In a process of making jellies from fruits high in natural pectin content, the steps of reducing the fruit to a pulpy mass, inoculating the mass of fruit with an enzyme capable of destroying the pectin, maintaining the mass at a temperature near the optimum for the action of the enzyme until a portion of the pectin is substantially destroyed, and then jellifying the partially depectinized fruit.

6. In a process of preparing jam and jelly from fruit high in natural pectin content, the steps of reducing the fruit to a pulpy mass, inoculating a portion of said mass of fruit with an enzyme capable of destroying the pectin, maintaining the mass at a temperature near the optimum for the action of the enzyme until the pectin is substantially destroyed, mixing the depectinized fruit with the untreated portion of the fruit mass, and then jellifying the mixture.

7. In a process of manufacturing jelly from fruit juice high in naturally occurring pectin, the steps of depectinizing the fruit juice by the action of an added enzyme to render innocuous the pectin naturally present in the fruit juice, and then jellifying the depectinized fruit juice.

8. In a process of manufacturing jam from fruit high in naturally occurring pectin, the steps of depectinizing the fruit by the action of an added enzyme to render innocuous the pectin naturally present in the fruit, and then jellifying the depectinized fruit.

9. In a process of manufacturing jelly from cranberries, the steps of depectinizing the cranberry juice by means of an added enzyme to render innocuous the pectin naturally present in the cranberry juice, and then jellifying the depectinized cranberry juice.

10. In a process of manufacturing jam from cranberries, the steps of depectinizing the cranberries by means of an added enzyme to render innocuous the pectin naturally present in the cranberries, and then jellifying the depectinized cranberries.

11. In a process of preparing jams and jellies from fruits containing natural pectin capable of interfering with the manufacture of jams and jellies therefrom, the steps of reducing the fruit to a pulpy mass, inoculating the mass of fruit with pectinase, maintaining the mass at a temperature between 25° C. and 50° C. until the natural pectin of the fruit is rendered innocuous, straining the mass to remove solids, and then jellifying the resulting depectinized fruit juice.

12. In a process of manufacturing jams and jellies from fruit containing pectin, the steps of depectinizing the fruit by means of added enzyme to render innocuous the pectin naturally present in the fruit, separating the juice from insoluble fruit solids, and jellifying the resulting juice by the controlled use of pectin from another source.

RAYMOND EDWARD COX.